United States Patent [19]

Smith et al.

[11] Patent Number: 5,228,355
[45] Date of Patent: Jul. 20, 1993

[54] PTO UNIT FOR A TRANSMISSION OR THE LIKE INCLUDING A LUBRICATION SYSTEM OPERABLE ONLY WHEN THE PTO IS IN OPERATION

[75] Inventors: Wallace E. Smith, Chelsea; Ronald Kruger, Grand Blanc; Eric Anderson, Ann Arbor, all of Mich.

[73] Assignee: Dana Corporation, Toledo, Ohio

[21] Appl. No.: 792,603

[22] Filed: Nov. 15, 1991

[51] Int. Cl.⁵ .................... F16H 57/04; F16H 37/06
[52] U.S. Cl. ................................ 74/467; 74/15.86; 184/6.12; 184/6.28
[58] Field of Search .................. 74/15.86, 467; 192/113 B; 184/6.12, 6.28

[56] References Cited

U.S. PATENT DOCUMENTS

| | | | |
|---|---|---|---|
| 1,589,093 | 6/1926 | Barrett | 74/15.86 |
| 1,872,924 | 8/1932 | Galanot | 74/15.86 |
| 2,344,156 | 3/1944 | McCormick et al. | 184/6.12 |
| 2,582,466 | 1/1952 | Strehlow | 184/6.12 X |
| 2,932,202 | 4/1960 | Rinkema | 74/15.86 |
| 3,540,297 | 11/1970 | Wagner et al. | 74/15.86 |
| 3,618,712 | 2/1970 | Casey | 184/6.28 |
| 3,724,598 | 4/1973 | Smith | 184/6.12 X |
| 4,356,889 | 11/1982 | Teeter | 184/6.12 |
| 4,425,817 | 1/1984 | Wells et al. | 74/46.7 |
| 4,773,277 | 9/1988 | Cook et al. | 74/377 |
| 4,811,614 | 3/1989 | Lasden | 192/113 B X |

Primary Examiner—Allan D. Herrmann
Attorney, Agent, or Firm—Shlesinger, Arkwright & Garvey

[57] ABSTRACT

A PTO unit for a transmission or the like includes a housing having an interior chamber. A PTO drive shaft, mounted in the housing, includes a first drive connection for connection to an auxiliary device to provide power thereto. The PTO drive shaft includes a second drive connection. A lubricating pump is connected to the second drive connection of the drive shaft to be in driving engagement therewith. A laterally shiftable gear is mounted on the drive shaft between the first and second drive connections. A gear shift mechanism is provided for laterally shifting the shiftable gear between the first and second positions. An idler shaft, spaced from and parallel to the drive shaft, is mounted in the housing, and a cluster gear is provided for rotation on the idler shaft. The cluster gear includes a transmission driven gear and a pinion. The pinion engages the laterally shiftable gear in the first position thereof for driving the PTO shaft, and is disengaged therefrom when the laterally shiftable gear is in the second position. The idler shaft includes a hose for receiving a lubricant from the pump and injecting it into the housing to maintain the PTO unit lubricated only when the pinion is engaged with the laterally shiftable gear.

15 Claims, 2 Drawing Sheets

PTO UNIT FOR A TRANSMISSION OR THE LIKE INCLUDING A LUBRICATION SYSTEM OPERABLE ONLY WHEN THE PTO IS IN OPERATION

FIELD OF THE INVENTION

The present invention is directed to power take-off (PTO) units, and more particularly to a PTO unit for a transmission or the like including a lubrication system operable only when the PTO is in operation.

BACKGROUND OF THE INVENTION

A wide variety of power take-off units have been proposed in the art. The PTOs are used in conjunction with the power transmissions of trucks, tractors and other motor vehicles to provide auxiliary power transmission for such things as driving compressors on refrigerated trucks, operating auxiliary farm equipment, operating fire truck accessories, operating tailgates and lifts on trucks and the like. Generally, the power take-off unit is mounted on the main transmission so that an idler gear in the take-off engages a transmission gear for driving the PTO. Conventionally, a PTO is mounted on the transmission case at either a "5 or 7 o'clock" position, such that lubricating oil from the oil sump of the transmission, gear box or transfer case flows by gravity into the PTO housing for lubricating the PTO components.

The prior art, however, does not teach an acceptable system for providing lubrication to the PTO housing in the instances where the PTO is mounted on the transmission case above the oil level in, for example, the transmission sump, such as at a "10 or 2 o'clock" position.

In view of the deficiency associated with conventional PTO lubrication systems, there is a need in the art for a PTO unit that includes a lubrication system which provides lubrication to the internal components of the PTO unit mounted above the oil level of the transmission sump, and which is operable only when the PTO is in operation.

SUMMARY OF THE INVENTION

The principal advantage of the invention is in providing a PTO unit for a transmission or the like that includes a lubrication system which is operable only when the PTO is operating, and which is capable of effectively lubricating the PTO components in the instances where the PTO is mounted above the oil level of, for example, the transmission sump. The lubrication system is further advantageous in that it produces low pressure (2-3 psi), circulates low volume of the lubricant (1-3 gallons/minute), relatively inexpensive to manufacture, and forms a compact unit which can be easily mounted directly to the rear cover of the PTO unit. The lubrication system also efficiently delivers the lubricant directly to the idler shaft with a minimum distance of travel, and is further versatile in that it can be retrofitted to existing PTO units, without making any modifications thereto or requiring any additional parts.

In accordance with the above-mentioned advantages of the invention, a PTO unit for a transmission or the like includes a housing having an interior chamber. A PTO drive shaft, mounted in the housing, includes a first drive connection for connection to an auxiliary device to provide power thereto. The PTO drive shaft further includes a second drive connection. A lubricating pump is connected to the second drive connection of the PTO drive shaft to be in driving engagement therewith. A laterally shiftable gear is mounted on the PTO drive shaft between the first and second drive connections. A mechanism including a gear shift is associated with the shiftable gear for laterally shifting the same between first and second positions. An idler shaft, spaced from and parallel to the drive shaft, is mounted in the housing, and a cluster gear is provided for rotation on the idler shaft. The cluster gear includes a transmission driven gear and a pinion. The pinion engages the laterally shiftable gear in the first position thereof for driving the PTO shaft, and is disengaged therefrom when the laterally shiftable gear is in the second position. The idler shaft includes a mechanism for receiving a lubricant from the pump and injecting it into the housing to maintain the PTO unit lubricated only when the pinion is engaged with the laterally shiftable gear.

BRIEF DESCRIPTION OF THE DRAWINGS

The advantages and novel features of the invention will become apparent from a detailed description of the preferred embodiment of the invention illustrated in the accompanying drawings, wherein.

DETAILED DESCRIPTION OF A PREFERRED EMBODIMENT OF THE INVENTION

Figure 1:
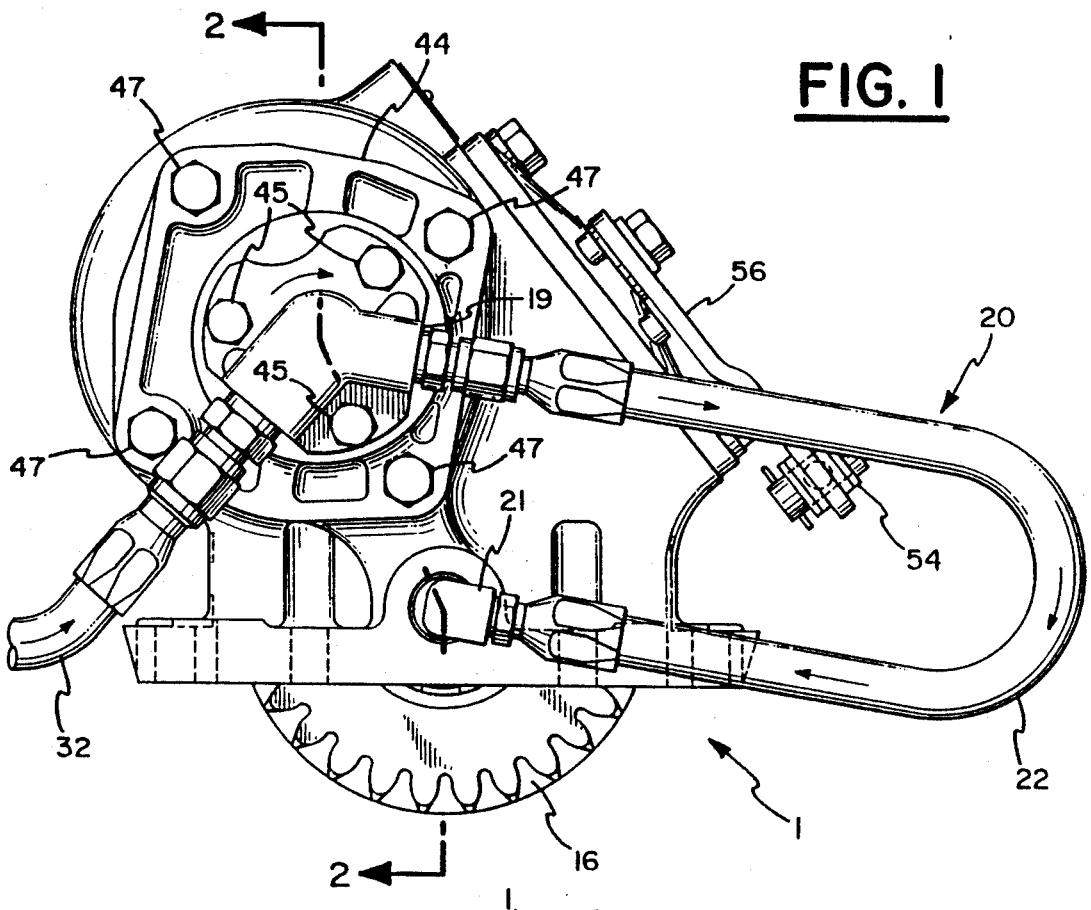
FIG. 1 is a side elevational view of the PTO unit of the invention showing the lubricating pump mounted thereon.
Figure 2:
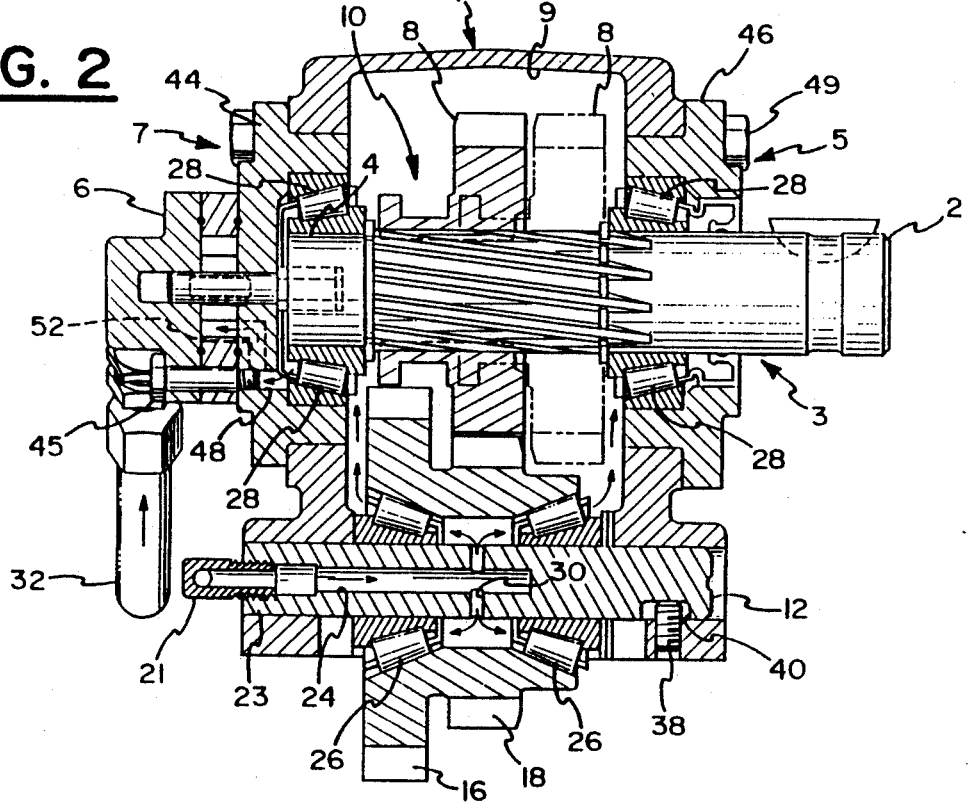
FIG. 2 is a sectional view taken along line 2—2 of FIG. 1, showing in phantom lines the disengaged position of the shiftable gear on the PTO drive shaft.
Figure 3:
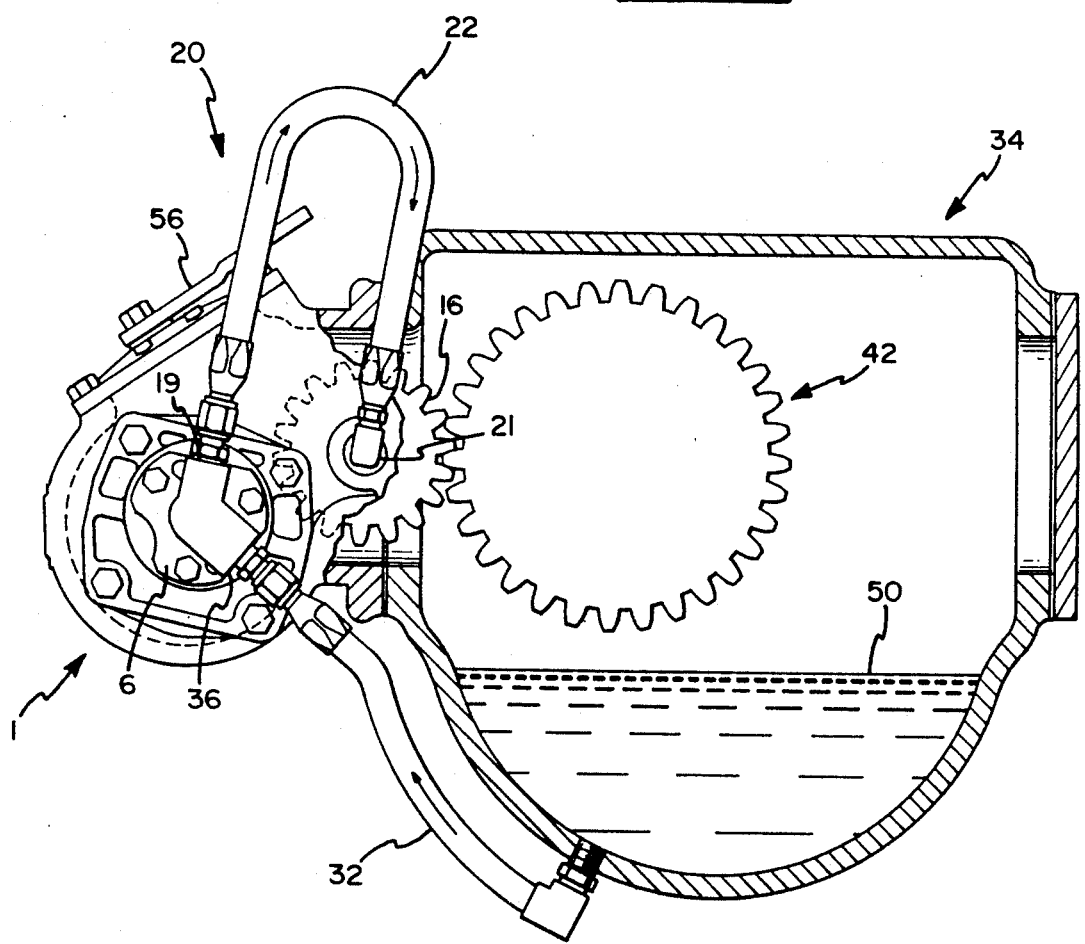
FIG. 3 is a side elevational view of the PTO unit of the invention, shown mounted onto a transmission housing.

As shown in FIGS. 1-3, the PTO unit of the present invention includes housing 1 having mounted therein drive shaft 3. The shaft 3 includes auxiliary device connection 2 on the first side 5 of housing 1, and connection 4 on the second side 7 thereof for connection to lubricating pump 6.

As best shown in FIG. 2, a laterally shiftable spur gear 8 is mounted on the PTO drive shaft 3 between the connections 2 and 4 thereof. The gear 8 can be shifted between the first engaged (shown in solid lines in FIG. 2), and second disengaged (shown in phantom lines in FIG. 2) positions by gear shift mechanism 10. An idler shaft 12 is mounted in the housing 1 generally parallel to and below the drive shaft 3. The idler shaft 12 remains stationary in the housing 1, however, includes cluster gear 14 for rotation thereabout. The cluster gear 14 includes transmission driven gear 16 and pinion 18 which engages with spur gear 8 for driving PTO shaft 3.

As best shown in FIGS. 1 and 3, idler shaft 12 includes lubricant receiving assembly 20 which has hose 22 for connecting pump output 19 to an input fitting or nipple 21 screwed into the end 23 of idler shaft 12. As shown in FIG. 2, passageway 24 axially extends through a length portion of the idler shaft 12, and connects the hose 22 with interior chamber 9 of housing 1. Bearing assemblies 26 and 28 are provided for idler shaft 12 and drive shaft 3, respectively. The idler shaft 12 includes radially extending ports 30 which are in fluid communication with and connect internal chamber 9 with passageway 24. A second hose 32 connects transmission housing 34 (only the components necessary for an understanding of the invention are shown) to the input 36 of the pump 6, best shown in FIG. 3.

As shown in FIG. 2, an idler shaft lockpin 38 provided in housing 1 extends in recess 40 on the idler shaft 12. The lockpin 38 prevents rotational movement of the shaft 12 and further maintains it secured in housing 1. As shown in FIG. 3, gear 16 meshes with transmission drive gear 42.

The pump 6 and lubricant receiving assembly 20 are both positioned on second side 7 of the housing 1. The pump 6 is mounted onto plate 44 by conventional bolts 45, which in turn is mounted onto second side 7 of the housing 1 by conventional bolts 47. Likewise, drive shaft 3 is secured to the first side 5 of housing 1 by side plate 46 and conventional bolts 49.

In FIG. 1, reference numeral 54 designates a yoke connected to lever 56. A conventional cable (not shown) connects yoke 54 to a shifter (not shown) for actuating lever 56. The gear shift mechanism 10 is connected to lever 56 by conventional linkages.

OPERATION

In operation, when lever 56 is caused to be actuated by the operator, the spur gear 8 shifts from its disengaged position so as to engage pinion 18 for thereby driving PTO shaft 3. The rotation of shaft 3 causes the pump 6 to begin a flow of lubricant 50 from transmission housing 34 to pump input 36 via hose 32, from pump 6 to idler shaft 12 via hose 22, and into the interior chamber 9 of housing 1 via idler shaft passageway 24 and ports 30, where it lubricates bearing assemblies 26. The lubricant 50 then flows upwardly in the interior chamber 9 to lubricate bearing assemblies 28, and is finally received back into pump 6 via interconnected passageways 48 and 52 in end plate 44, shown in FIG. 2.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

What is claimed is:

1. A PTO unit for a transmission or the like including lubricating means operable only when said PTO is operating, the unit comprising:
    a) a housing including an interior chamber;
    b) a PTO drive shaft mounted in said housing;
    c) said PTO drive shaft having first drive connection means for connection to an auxiliary device for powering said auxiliary device;
    d) said PTO drive shaft having a second drive connection means;
    e) a lubricating pump connected to said second drive connection means for driving engagement therewith;
    f) said PTO drive shaft having mounted thereon between said first drive connection means and said second drive connection means a laterally shiftable gear;
    g) means associated with said shiftable gear including gear shift means for laterally shifting said shiftable gear between first and second positions;
    h) an idler shaft mounted in said housing spaced from and parallel to said drive shaft;
    i) a cluster gear mounted for rotation on said idler shaft;
    j) said cluster gear including a transmission driven gear and a pinion;
    k) said pinion being engaged with said shiftable gear when in said first position for driving said PTO shaft and disengaged from said shiftable gear when in said second position; and
    l) said idler shaft having means for receiving a lubricant from said lubricating pump and injecting the lubricant into said housing to maintain said PTO unit lubricated only when said pinion is engaged with said shiftable gear.

2. The PTO unit as in claim 1, and wherein:
    a) said lubricating means includes a hose connecting said lubricating pump with said idler shaft.

3. The PTO unit as in claim 2, and wherein:
    a) said idler shaft includes a passageway connecting said hose with said interior chamber.

4. The PTO unit as in claim 3, and wherein:
    a) said drive shaft and said idler shaft include bearings; and
    b) said idler shaft includes internal port means for connecting said passageway with said internal chamber.

5. The PTO unit as in claim 4, and wherein:
    a) said idler shaft includes a nipple for connection to said hose.

6. The PTO unit as in claim 1, and wherein:
    a) said housing includes first and second sides; and
    b) said first drive connection means is disposed on said first side of said housing.

7. The PTO unit as in claim 6, and wherein:
    a) said second drive connection means is disposed on said second side of said housing.

8. The PTO unit as in claim 6, and wherein:
    a) said lubricating pump and said means for receiving lubricant into said housing are positioned on said second side of said housing.

9. The PTO unit as in claim 8, and wherein:
    a) said idler shaft includes a nipple positioned on said second side of said housing.

10. The PTO unit as in claim 6, and wherein:
    a) said transmission driven gear is on said second side of said housing and aligned with said gear shift means when said shiftable gear is engaged with said pinion.

11. The PTO unit as in claim 6, and wherein:
    a) said gear shift means is positioned centrally of said interior chamber and offset from said transmission driven gear when said shiftable gear is in said second position with said shiftable gear being positioned on said first side and offset from said pinion.

12. The PTO unit as in claim 1, and including:
    a) means for connecting said lubricating pump with said transmission.

13. The PTO unit as in claim 1, and wherein:
    a) said idler shaft includes a recess; and
    b) an idler shaft lock pin in said housing for engagement with said recess.

14. The PTO unit as in claim 6, and wherein:
    a) said first and second sides each includes a removable plate for accessing said housing.

15. The PTO unit as in claim 14, and wherein:
    a) said second side plate includes means for securing said lubricating pump thereto.

* * * * *